United States Patent
Liu

(10) Patent No.: US 7,796,535 B2
(45) Date of Patent: Sep. 14, 2010

(54) SYSTEM AND METHOD FOR MONITORING A DATA PACKET

(75) Inventor: Chia J. Liu, Marlton, NJ (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 554 days.

(21) Appl. No.: 11/515,074

(22) Filed: Sep. 1, 2006

(65) Prior Publication Data

US 2008/0056153 A1 Mar. 6, 2008

(51) Int. Cl.
*H04L 12/28* (2006.01)
(52) U.S. Cl. .................. 370/254; 370/252; 370/389; 709/245; 709/246; 709/224
(58) Field of Classification Search ........................ None
See application file for complete search history.

(56) References Cited

U.S. PATENT DOCUMENTS 7,496,044 B1 * 2/2009 Wing .......................... 370/242

2004/0105391 A1 * 6/2004 Charcranoon ............... 370/252
2005/0022189 A1 * 1/2005 Proulx et al. ................ 718/100
2006/0023638 A1 * 2/2006 Monaco et al. ............. 370/252

OTHER PUBLICATIONS

Request for Comments: 792, Sep. 1981, Internet Control Message Protocol, pp. 1-19.*
Traceroute, encyclopedia definition from Wikipedia, http://en.wikipedia.org/wiki/Traceroute, Aug. 16, 2006.

* cited by examiner

*Primary Examiner*—Ayaz R Sheikh
*Assistant Examiner*—Nicholas Sloms
(74) *Attorney, Agent, or Firm*—Banner & Witcoff, Ltd.

(57) ABSTRACT

The embodiments described herein include a system and method for monitoring a packet adapted to traverse a network having a plurality of devices. The system and method enable an operator to efficiently determine the marking of a packet at each intermediate hop and the destination within a network by executing an algorithm through the use of an operating system.

10 Claims, 4 Drawing Sheets ur01.plainfield.nj>trace 68.86.12.186 dscp=34

Type escape sequence to abort.

| 78 | 80 | 82 | 84 |
|---|---|---|---|
| 1 | 68.86.209.198 | 0 msec 0 msec 0 msec | dscp=34 |
| 2 | 68.86.209.202 | 0 msec 0 msec 0 msec | dscp=34 |
| 3 | 68.86.208.6 | 4 msec 0 msec 0 msec | dscp=34 |
| 4 | 68.86.208.14 | 4 msec 4 msec 4 msec | dscp=34 |
| 5 | 68.86.208.33 | 4 msec 4 msec 4 msec | dscp=34 |
| 6 | 68.86.72.9 [AS 23253] | 4 msec 4 msec 4 msec | dscp=8 |
| 7 | 68.86.72.14 [AS 23253] | 8 msec 8 msec 8 msec | dscp=8 |
| 8 | 68.87.129.137 [AS 33657] | 12 msec 12 msec 8 msec | dscp=8 |
| 9 | 68.87.129.146 [AS 33657] | 12 msec 8 msec 12 msec | dscp=8 |
| 10 | 68.87.129.149 [AS 33657] | 12 msec * 8 msec | dscp=8 |

76

FIG. 4 ur01.plainfield.nj>trace 68.86.12.186 dscp=34

Type escape sequence to abort.

| 88 | 90 | 92 | 94 | 96 |
|---|---|---|---|---|
| 1 | 68.86.209.198 | 0 msec 0 msec 0 msec | dscp=34 | |
| 2 | 68.86.209.202 | 0 msec 0 msec 0 msec | dscp=34 | |
| 3 | 68.86.208.6 | 4 msec 0 msec 0 msec | dscp=34 | |
| 4 | 12.86.208.14 | 4 msec 4 msec 4 msec | dscp=34 | exp=8 |
| 5 | 12.86.208.33 | 4 msec 4 msec 4 msec | dscp=34 | exp=8 |
| 6 | 12.86.72.9 [AS 23253] | 4 msec 4 msec 4 msec | | exp=8 |
| 7 | 12.86.72.14 [AS 23253] | 8 msec 8 msec 8 msec | | exp=8 |
| 8 | 12.87.129.137 [AS 33657] | 12 msec 12 msec 8 msec | | exp=8 |
| 9 | 68.87.129.146 [AS 33657] | 12 msec 8 msec 12 msec | dscp=34 | |
| 10 | 68.87.129.149 [AS 33657] | 12 msec * 8 msec | dscp=34 | |

FIG. 5

```
Type escape sequence to abort.

100         110        120
  ⌒           ↓          ⌒
  1 68.86.209.198        DSCP:
120┤→ 0,1,2,3,4,5,6,7,8,9,10,11,12,13,14,15,16,17,18,19,20,21,22,23,24,25,26,27,28,29,30,31,32,
    → 33,34,35,36,37,38,39,40,41,42,43,44,45,46,47,48,49,50,51,52,53,54,55,56,57,58,59,60,61,62,63
   2 68.86.209.202       DSCP:
      0,1,2,3,4,5,6,7,8,9,10,11,12,13,14,15,16,17,18,19,20,21,22,23,24,25,26,27,28,29,30,31,32,
      33,34,35,36,37,38,39,40,41,42,43,44,45,46,47,48,49,50,51,52,53,54,55,56,57,58,59,60,61,62,63
   3 68.86.208.6 4       DSCP:
      0,1,2,3,4,5,6,7,8,9,10,11,12,13,14,15,16,17,18,19,20,21,22,23,24,25,26,27,28,29,30,31,32,
      33,34,35,36,37,38,39,40,41,42,43,44,45,46,47,48,49,50,51,52,53,54,55,56,57,58,59,60,61,62,63
   4 68.86.208.14        DSCP:
      0,1,2,3,4,5,6,7,8,9,10,11,12,13,14,15,16,17,18,19,20,21,22,23,24,25,26,27,28,29,30,31,32,
      33,34,35,36,37,38,39,40,41,42,43,44,45,46,47,48,49,50,51,52,53,54,55,56,57,58,59,60,61,62,63
   5 68.86.208.33        DSCP:
      0,1,2,3,4,5,6,7,8,9,10,11,12,13,14,15,16,17,18,19,20,21,22,23,24,25,26,27,28,29,30,31,32,
      33,34,35,36,37,38,39,40,41,42,43,44,45,46,47,48,49,50,51,52,53,54,55,56,57,58,59,60,61,62,63
   6 68.86.72.9 [AS 23253]   DSCP:
140─ 0,1,2,3,4,5,6,7,8,9,10,11,12,13,14,15,16,17,18,19,20,21,22,23,24,25,26,27,28,29,30,31,32,
      33,8,35,36,37,38,39,40,41,42,43,44,45,46,47,48,49,50,51,52,53,54,55,56,57,58,59,60,61,62,63
   7 68.86.72.14 [AS 23253]  DSCP:
140─ 0,1,2,3,4,5,6,7,8,9,10,11,12,13,14,15,16,17,18,19,20,21,22,23,24,25,26,27,28,29,30,31,32,
      33,8,35,36,37,38,39,40,41,42,43,44,45,46,47,48,49,50,51,52,53,54,55,56,57,58,59,60,61,62,63
   8 68.87.129.137 [AS 33657] DSCP:
140─ 0,1,2,3,4,5,6,7,8,9,10,11,12,13,14,15,16,17,18,19,20,21,22,23,24,25,26,27,28,29,30,31,32,
      33,8,35,36,37,38,39,40,41,42,43,44,45,46,47,48,49,50,51,52,53,54,55,56,57,58,59,60,61,62,63
   9 68.87.129.146 [AS 33657] DSCP:
140─ 0,1,2,3,4,5,6,7,8,9,10,11,12,13,14,15,16,17,18,19,20,21,22,23,24,25,26,27,28,29,30,31,32,
      33,8,35,36,37,38,39,40,41,42,43,44,45,46,47,48,49,50,51,52,53,54,55,56,57,58,59,60,61,62,63
  10 68.87.129.149 [AS 33657] DSCP:
      0,1,2,3,4,5,6,7,8,9,10,11,12,13,14,15,16,17,18,19,20,21,22,23,24,25,26,27,28,29,30,31,32,
      33,8,35,36,37,38,39,40,41,42,43,44,45,46,47,48,49,50,51,52,53,54,55,56,57,58,59,60,61,62,63
```

FIG. 6

SYSTEM AND METHOD FOR MONITORING A DATA PACKET

TECHNICAL FIELD

The embodiments described herein relate to a system and method for monitoring data packets.

BACKGROUND

Multiple service operator (MSO) networks and/or customer networks conventionally forward data in packets. It is common for these packets to be transmitted across such networks through the use of devices including routers and servers. As recognized by one of ordinary skill, the transmitted packet typically has a marking that indicates the manner in which the packet is to be forwarded. Particularly, a packet may have a marking that indicates whether the packet should receive "best-effort" delivery or quality of service (QoS) delivery in the event of network traffic congestion. Although a packet may have a particular marking, it is well known that in some events the network devices (e.g., routers, servers, etc.) that forward the packet may cause the marking to change. In most cases, such marking changes are undesirable to network operators because the packet will experience improper handling in the event of network traffic congestion, or become discarded due to differentiated services code point (DSCP) based access-list filtering.

Thus, there is a need for a system that is capable of monitoring the marking of packets that traverse a network to efficiently identify those network devices that cause packet marking changes.

SUMMARY

The embodiments described herein include a system and method for monitoring a packet configured to traverse a QoS-enabled IP network having a plurality of devices. The method includes detecting or monitoring a marking of the packet at each intermediate hop and destination in the network. The method further includes providing an indication of the marking at each device.

BRIEF DESCRIPTION OF THE DRAWINGS

The features of the present invention which are set forth with particularity in the appended claims. The present invention, both as to its organization and manner of operation, together with further advantages thereof, may be best understood with reference to the following description, taken in connection with the accompanying drawings in which:

FIG. 4 illustrates a display of a packet route and DSCP marking as seen by intermediate devices and a destination device in accordance with teachings of the present invention;

FIG. 5 illustrates an alternative embodiment of a packet route and DSCP marking as seen by intermediate devices and a destination device in accordance with teachings of the present invention; and FIG. 6 illustrates yet another embodiment of a packet route and DSCP marking as seen by intermediate devices and a destination device in accordance with teachings of the present invention.

DETAILED DESCRIPTION OF THE PREFERRED EMBODIMENT(S)

Figure 1:
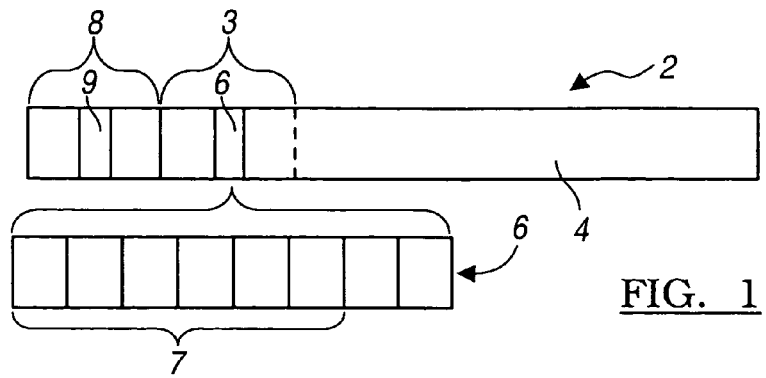
FIG. 1 illustrates an exemplary data packet in accordance with teachings of the present invention.

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art to variously employ the present invention.

As commonly known, the differentiated services (Diffserv) architecture is based on a model wherein traffic entering a network is classified at the boundaries (or demarcation points) of the network, and assigned to different behavior aggregates. Each behavior aggregate is typically identified by a DiffServ codepoint (i.e., quality of service (QoS) marking). In addition, to enable network congestion management and congestion avoidance features in routers, a service provider can utilize DiffServ based access control list (ACL) features to enable filtering of unwanted traffic in different parts of the network. Such filtering enhances network security and reduces the network's dependence on complicated firewalls. It is desirable that service providers ensure that the QoS marking of the network traffic (i.e., data packets) is not altered by devices that are traversed by the network traffic (i.e., intermediate devices).

Accordingly, the embodiments described herein provide an exemplary system and method for monitoring a packet that traverses a network(s). The system enables a user/operator to efficiently determine a marking of the packets. Conventionally, operators are required to use a sniffer or telnet into a particular device (e.g., router, server, and the like) in order to monitor the marking of a traversing packet. As well known, a sniffer is a software program that monitors network traffic. A sniffer can be installed in a user's personal computer (PC) or in a dedicated hardware platform. However, the sniffer is costly to implement in networks having a large number of routers. Operationally, it is difficult to implement sniffer programs on a network wide basis. Additionally, the sniffer programs monitor the packet marking on a packet-by-packet basis, which is computationally intensive.

With the teachings of the present invention, an operator can utilize an enhanced traceroute debugging tool (hereinafter referred to as a trackDSCP) in a manner that allows the operator to efficiently track/monitor the marking of the packet along a network flight path. The trackDSCP tool may be implemented via a software program in the form of software code that is stored on devices (e.g., routers, servers, and the like) within a network. In one embodiment, the software code that embodies the trackDSCP tool may be implemented within the network layer (also referred to as layer 3) of the multi-layered communications model, open systems interconnections (OSI). Accordingly, an operator having access to a network may run the trackDSCP tool to monitor the marking of packets as they traverse the network devices. In the embodiments described herein, devices that are traversed by network packets are also referred to as "nodes" and "hops." Additionally, the terms "packet" and "datagram" are used interchangeably to refer to any unit of data capable of being routed from one network device to another.

In one aspect, the packet is compatible with, but not limited to, version 4 of the Internet Protocol (IPv4), version 6 of the Internet Protocol (IPv6), and the like. Additionally, the packets (or datagrams) referred to herein may be compatible with the user datagram protocol (UDP). As recognized by one of ordinary skill in the art, the UDP is a simple, datagram-oriented (i.e. connectionless) transport layer protocol. Nevertheless, in FIG. 1, a detailed illustration of an exemplary packet (i.e., packet 2) is provided. The packet 2 includes a header section 3 and a payload section 4. The header section 3 includes a plurality of bytes, at least one of which (i.e., the byte labeled 6) may contain the packet marking that indicates how the packet 2 should be handled by network devices. It is recognized that the byte 6 is commonly referred to as the type of service (TOS) byte. The first 6 bits (as indicated by bracket 7) of the byte 6 are commonly referred to as the differentiated services code point (DSCP) field. The packet 2 may also include a multi-protocol label switching (MPLS) header 8. Although the MPLS header 8 is not required, it may be appended to the packet 2 by MPLS enabled networks. Accordingly, the MPLS header 8 includes a set of bits 9 that can serve as a marking, which also indicates how the packet 2 should be handled by MPLS-enabled network devices. The bits 9 represent a group of bits referred to as "experimental," which can be set to specific values in accordance with the system operator. Thus, the marking of the packet may be indicated by bits within the DSCP field and/or the multi-protocol label switching header. It is recognized, however, that the teachings of the present invention may utilize other packet marking schemes without departing from the scope of the present invention.

Through the use of the embodiments described herein, a system operator may utilize the trackDSCP tool to determine which, if any, devices cause changes to the packet marking. Particularly, the operator may execute the trackDSCP tool on an operating system connected to the network and cause the generation of a packet that traverses the network along the same route as a packet under investigation (i.e., a packet that has previously experienced a marking change). The operator may also set the marking of the packet when running the trackDSCP tool. As the packet traverses the network, via the network devices, the packet marking information is provided to the operator along with the internet protocol (IP) address at each intermediate hop and the destination. As stated above, the term "hop" refers to devices such as routers, servers, and the like that are traversed by the packet during travel across the network. Accordingly, an intermediate hop is a device that is traversed by a packet as the packet is in route to its destination. The device at the location at which the traversing packet is intended to be received is referred to as the "destination" or "destination device."

Now, the operation of the trackDSCP tool will be described. In one embodiment, the trackDSCP tool utilizes a time to live (TTL) feature. The TTL feature is a value given to a packet that represents the number of hops or devices along a network path through which a packet can travel before that value reaches zero. As the packet traverses a network device, the traversed device decrements the TTL value by 1. Once the value reaches zero, the packet is discarded and an internet control message protocol (ICMP) message is sent back to the originating or source device (e.g., router/server). In some cases the ICMP message appears as an error message such as a "time exceeded" or "port unreachable" error message. Although the ICMP messages may appear as an error message, these messages actually provide notification to system operators. For example, when a packet traverses an intermediate device along its path to a specific destination and the TTL value reaches zero, the intermediate device generates the ICMP message, which may be returned as a "time exceeded" error message. In one embodiment, the time exceeded error message notifies the system operator that intermediate devices have been traversed and the destination has not been reached. Once the packet reaches the device (i.e., router or server) at the destination, an ICMP message may be returned as a "port unreachable" error message. The port unreachable error message notifies the system operator that the destination has actually been reached. It is recognized, however, that the present invention contemplates the use of other types of messages without departing from the scope of the present invention.

It is also recognized that the packets generated through the use of the trackDSCP tool contain an IP address of the destination and the device that generated the packet (source device). Also, each device (i.e., router, server and the like) in the network has an IP address. As such, each traversed device is able to determine whether it is an intermediate or a destination device by comparing its IP address with the IP address of the destination contained within the packet.

As an example, upon execution of the trackDSCP tool, an IP packet (also referred to as a datagram) with a TTL value of 1 is sent to a destination device from a source device. The packet may have a DSCP marking of a specific value of interest. For example, the packet may have a DSCP marking of 34, which can indicate video traffic in the operator's production network. Accordingly, the first router to handle the packet decrements the TTL value by 1, which leaves the packet with a TTL value of zero. The router then discards the packet, and sends back a message, such as the ICMP "time exceeded" error message. In this example, the time exceeded error message is generated because the destination address contained within the packet does not match the IP address of the first router.

Nevertheless, the ICMP message will contain the IP header (including the TOS byte) of the discarded packet, which will provide the DSCP marking of the discarded packet as seen by the first router. The responding router (i.e., the first router in this example) sends the ICMP message back to the source router. The source router having the trackDSCP tool reads the TOS byte data within the ICMP message and displays the data to the system operator. In this example, if the displayed DSCP marking is not 34, this is an indication that a device in the network between the source and the first router has caused a change in the packet marking.

The trackDSCP tool then sends a second packet with a TTL value of 2 for example. The first router will decrement the TTL value by 1 leaving the second packet with a TTL value of 1. A second router in the network will receive the packet and decrement the TTL value by 1 leaving the second packet with a TTL value of zero. As such, the packet will be discarded and the responding router (i.e., the second router) will send to the source router a second ICMP message. The ICMP message will also contain the IP header (including the TOS byte) of the discarded packet, which will have, among other information, the DSCP marking as seen by the second router. In this example, if the displayed DSCP marking is not 34, this is an indication that the first router or a device in the network between the first and the second router has caused a change in the packet marking.

This process of packet generation and return of ICMP messages continues until a packet is generated having a TTL value that is decremented to zero upon reaching a device (i.e., router, server and the like) that has an IP address that matches the IP address of the destination device contained within the generated packet. Once the packet reaches the destination device, the packet is discarded and the ICMP "port unreachable" error message is generated. The ICMP port unreachable message will also contain the IP header of the discarded packet. Accordingly, the trackDSCP tool reads the IP header information and obtains the DSCP marking of the generated packet as seen by the destination device. This information is displayed to the system operator.

Figure 2A:
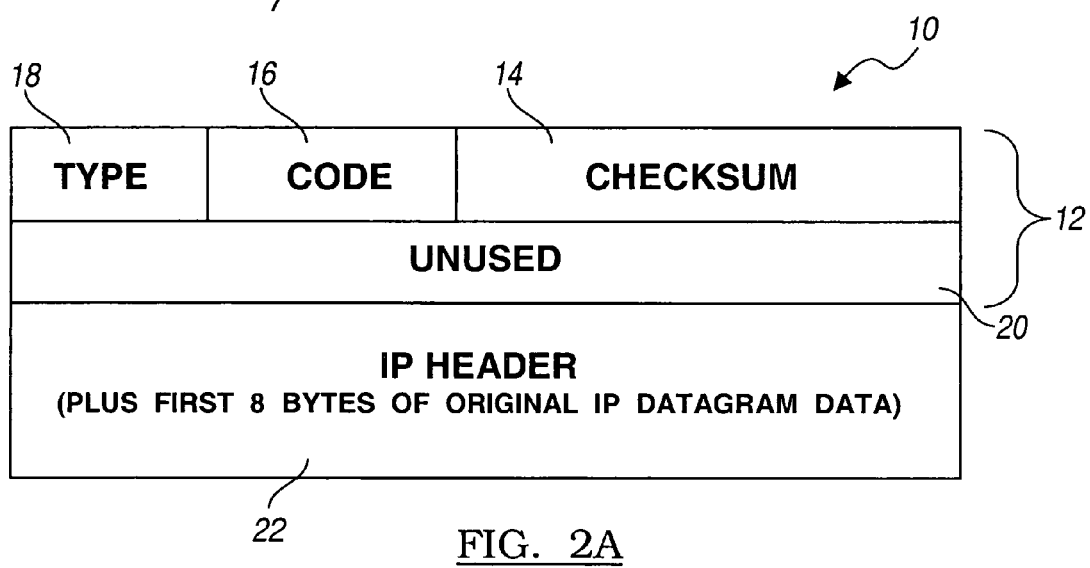
FIGS. 2A and 2B illustrate exemplary embodiments of data packet headers in accordance with teachings of the present invention.
Figure 2B:
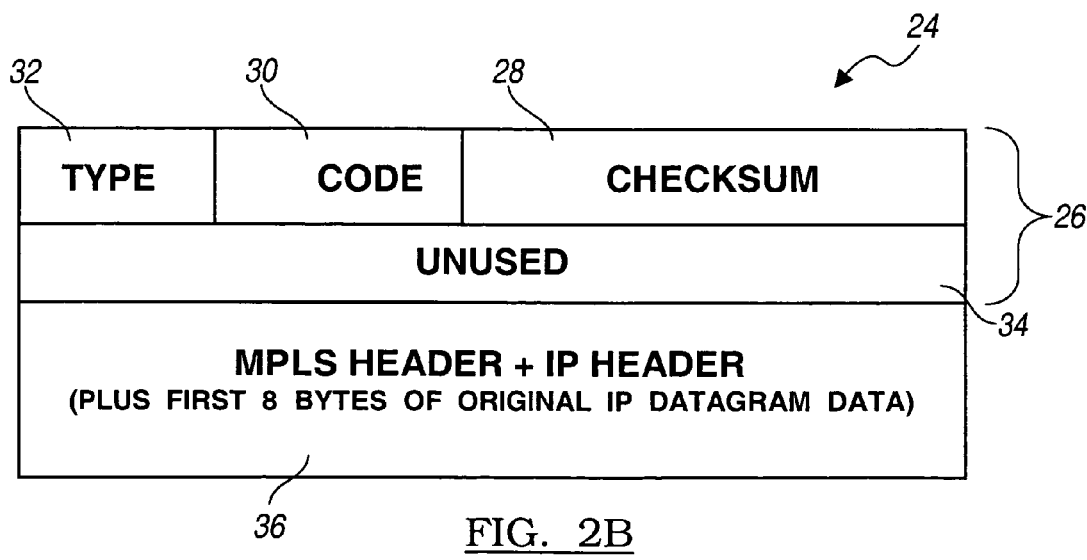

Now, referring to FIGS. 2A and 2B, detailed illustrations of headers 10 and 24 are provided. The headers 10 and 24 include an ICMP header 12 and 26 respectively. Here, as described above, during the execution of the trackDSCP tool, an intermediate or a destination device may generate the ICMP headers 12 and 26. When the ICMP headers 12 and 26 are generated, the packet is discarded. However, the IP header of the discarded packet, which contains the DSCP marking of the discarded packet, is included within a payload section 22 (FIG. 2A) or 36 (FIG. 2B) of the ICMP header. Accordingly, as shown, ICMP headers 12 and 26 are shown along with internet protocol (IP) header 22 and MPLS/IP header 36, respectively, wherein the payloads 22 and 36 include the first eight bytes of the original IP datagram data sent by the trackDSCP tool.

In FIG. 2A header 12 includes a checksum field 14, a code field 16, a type field 18, and an "unused" field 20. When the responding router formulates an ICMP message, it will set the checksum 14, the code field 16, the type field 18, and if necessary, the unused field 20. As recognized by one of ordinary skill, the checksum 14 enables the operator to confirm the integrity of the packet. For example, it is possible for the packet to become corrupted during transmission. As such, the operating system may include an algorithm that calculates the checksum and verifies whether the packet has been corrupted. Also, the type field 18 and the code field 16 provide an indication as to the nature of the type of error associated with the packet transmission. For example, type field 18 having a value of three and the code field 16 having a value of three indicates that a particular port is unreachable. Alternatively, type field 18 having a value of three and the code field 16 having a value of four, indicates that the packet is too large for transmission. Additionally, the type field 18 having a value of 11 and the code field 16 having a value of 0 indicates that a time-to-live (TTL) equals zero during transit. Also, the type field 18 having a value of 10 and code field 16 having a value of 0 indicates a router solicitation. Nevertheless, once the packet is returned to the operator with the header 12 and the original IP header within the payload 22, the operating system reads the header 12 and the payload 22. The ICMP payload 22 provides the system operator the DSCP marking information at each device (or node) along the route.

As stated above, after a responding router discards the original packet, the IP header of the original packet and the first eight data bytes of the original IP datagram/packet are copied into the payload 22. Specifically, within the types of service (TOS) byte of the IP header, the DSCP marking of the original packet is contained. Accordingly, the IP header within the payload 22 enables the monitoring system (i.e., the track DSCP tool) to determine the DSCP marking of the IP packets that traverse the network.

If an intermediate hop or the destination device is within a MPLS-enabled network, an MPLS header is also required to be included in the returned ICMP message. FIG. 2B illustrates a header 24 that is operable with a MPLS-enabled network. As recognized by one of ordinary skill, conventional MPLS headers include several bits, which are referred to as "experimental" (EXP) bits. These EXP bits may also provide the QoS marking for packets that traverse an MPLS enabled network.

Accordingly, in FIG. 2B the header 24 includes an ICMP header 26 and an IP/MPLS header within the payload 36. The payload 36 includes the IP header and the first eight data bytes of the original IP datagram that was generated by the source device through execution of the trackDSCP tool. The header 26 also includes a checksum field 28, a code field 30, a type field 32, and an unused field 34. As described herein, the teachings of the present invention provide for a display of the route of a packet and its associated marking (e.g., DSCP and/or MPLS marking).

Figure 3:
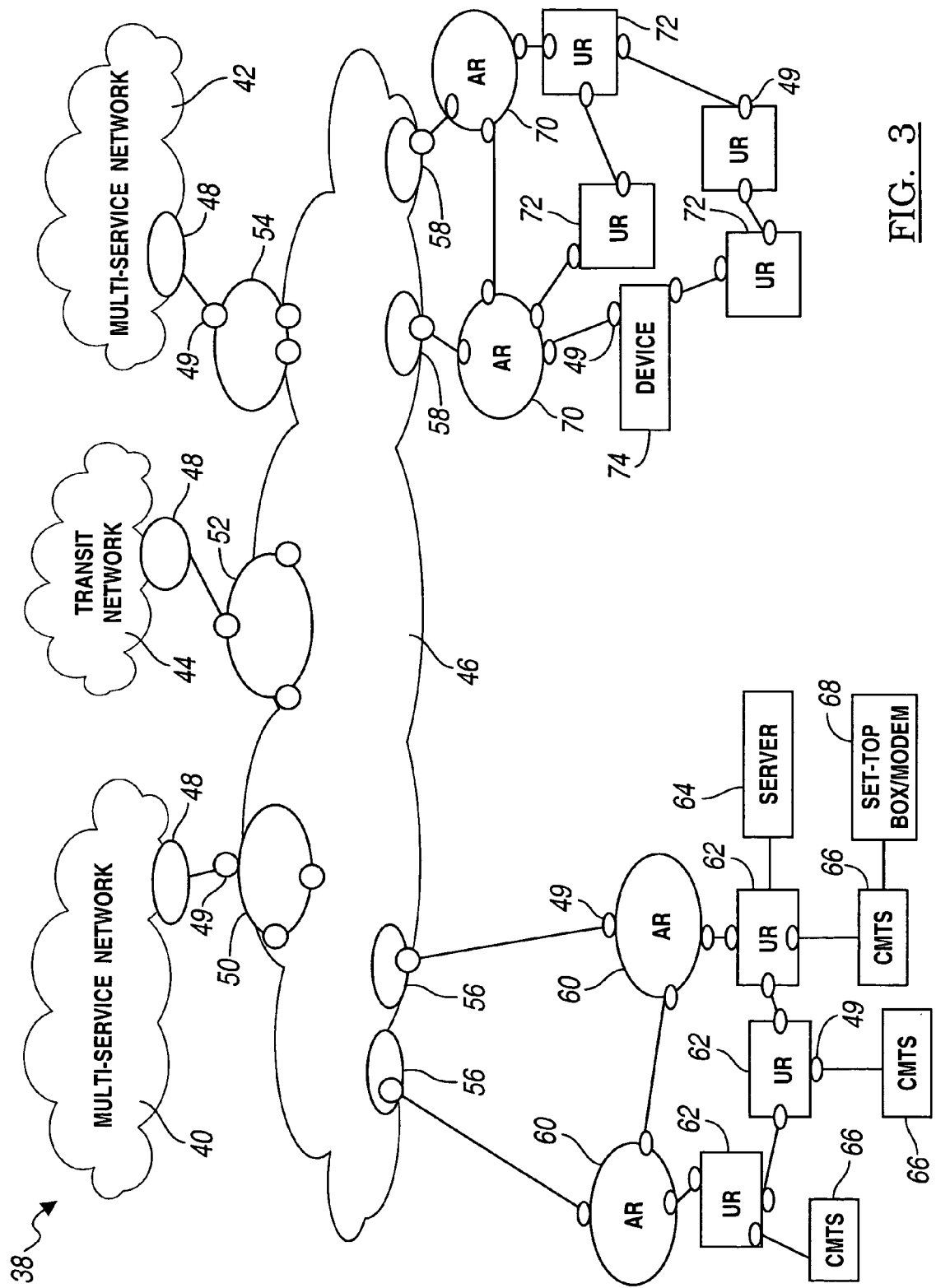
FIG. 3 illustrates a network capable of forwarding the packets illustrated in FIGS. 2A and 2B.

Now, referring to FIG. 3, a communications system 38 is provided in accordance with teachings of the present invention. Communications system 38 enables the delivery or forwarding of voice, video, e-mails, data and the like in the form of data packets from one network to another. Accordingly, a system operator having access to communications system 38 may utilize the trackDSCP tool to identify devices within the system that cause packet marking changes. Communications system 38 may be an internet protocol (IP) over a dense wavelength division multiplexing (DWDM) packet-switch network, an IP over an asynchronous transfer mode (ATM) network and the like. It is recognized, however, that the present invention is not limited to the communications system 38 shown in FIG. 3 but may be equally applied to other types of communications systems without departing from the scope of the present invention.

The communications system 38 includes a first peering multi-service network 40, a transit network 44, a second peering multi-service network 42, and a backbone network 46. Alternative embodiments may have more or less networks than those shown in FIG. 3. The networks 40, 42, 44 and 46, which may be referred to as service provider or data networks, enable the generation, transfer, and receipt of packets. Networks 40, 42, 44, and 46 may be multi-topology networks wherein packets travel on different links of the network based on the packet marking. For example, video packets may have dedicated travel links within the network while data packets have their own dedicated travel links within the network.

The networks 40, 42, 44, and 46 include data processing devices such as processors for utilizing the trackDSCP tool. Accordingly, the networks 40, 42, 44, and 46 have an operating system for causing the transmission of packets. The networks 40, 42, 44, 46 and other regional access networks also include the processors for monitoring the marking of the packet as it traverses hops within the network. The operating system also provides the packet marking and routing information to the operator. Additionally, essentially any device (routers, servers, and the like) that is operable with networks 40, 42, 44, 46 and regional access networks may have the trackDSCP tool stored thereon so as to enable the trackDSCP tool to be initiated at virtually any device within the network.

The transit network 44 may serve as an intermediate network for transmitting packets from one network to the Internet. As shown, networks 40, 42, and 44 include routers 48 for receiving and transmitting packets. The backbone network 46 is capable of interconnecting different customer markets in geographically dispersed locations. Thus, backbone network 46 and regional access networks enable customers to access various services available via networks 40, 42, and 44 including, but not limited to, the internet, cable, and telephony services. As such, the network 46 includes a number of routers 50, 52, 54, 56, and 58. These routers may function as peer and/or transit routers.

As shown, the routers include interfaces 49. The interfaces 49 enable proper queuing and reception of data packets that are configured to traverse communications system 38. For example, the interfaces 49 buffer packets in a manner so as to allow some packets to receive priority over others in the event of network congestion.

As shown in FIG. 3, the routers 56 are communicative with a set of routers 60 and 62. Routers 60 may function as aggregation routers (AR) that aggregate packets received from routers 62. In one aspect, the link between routers 60 and routers 56 is a high bandwidth connection to accommodate the flow of large bandwidths of data. The routers 62 are commonly referred to as "U-ring" (UR) routers based on their physical layout in the network. In one aspect, the routers 62 may be located within an optical transport node. The routers 62 are configured to route data and/or video from servers, such as server 64 and devices 66. It is recognized that in some embodiments, such as lower bandwidth communications systems, the routers 49 may not be included and the routers 62 may function as aggregate routers.

The server 64 may be an analog and digital simulcast (ADS) video server, a video-on-demand server, a high-speed data server, and the like. In one aspect of the present invention, an operator may utilize the operating system that is operable with the networks 40, 42, 44, and 46 to monitor packets generated by the server 64. The network operator can verify that packets from the server 64 have a predetermined packet marking as the packets traverse the router 62. Monitoring the packets transmitted by the server 64 will help ensure that the packets from the server 64 receive a particular packet delivery priority when traversing the network of communications system 38.

The server 64 and router 62 are configured to enable a customer to receive services via a set-top-box (STB)/modem. As described above, the customer may receive services including, but not limited to, cable, telephony, and/or internet services. As such, a STB/modem 68 may be coupled to a cable modem termination system (CMTS) 66. As recognized by one of ordinary skill, the CMTS 66 is a component that exchanges digital signals with devices such as the STB/modem 68 on a cable hybrid fiber coaxial (HFC) network.

The communications system 38 also includes a set of routers 70 and 72. In the embodiment shown, routers 70 may be aggregation routers while routers 72 may be U-ring routers. It is recognized that in lower bandwidth systems, routers 70 may not be necessary. Nevertheless, as shown, a device 74 is disposed between a router 70 and a router 72. The device 74 may be a deep packet inspection device that enables a network operator to characterize bandwidth utilization of different types of application traffic in his/her network. However, it is recognized that in some cases, the device 74 (as well as routers within communications system 38) may cause an undesirable change in the packet marking, either intentionally or unintentionally.

The operator may also utilize the trackDSCP tool by causing a packet to be generated by, for example, the server 64. Accordingly, packets originating from the server 64 may be monitored as the packets are transmitted via routers of communications system 38 and device 74. The transmitted packet will have a predetermined marking which should, in most cases, remain unchanged if the routers and devices within communications system 38 are operating properly. In one embodiment, once the packet reaches a router as allowed by the packet's specified TTL value, an ICMP message will be sent back to the monitoring system. The operating system will read the packet headers and display the packet route and corresponding marking at each network device. As such, the operator is able to determine which, if any, devices caused a change in the marking.

Now referring to FIG. 4, a display 76 is provided which shows a result of the trackDSCP tool. Accordingly, as shown, packet routing and marking information are provided. In accordance with the teachings of the present invention the display 76 will typically appear once the operator has run the trackDSCP tool. In this embodiment, each router (also referred to as node) in the path between the source device and the destination device has a number (i.e. corresponding to the number of hops in the packet's network flight path to its destination) as indicated in a first column (bracket 78). Accordingly, in this embodiment there are ten routers (or nodes) in the path between the originating device and the destination device. The nodes 1-9 indicate intermediate devices while node 10 indicates a destination device. A second column (bracket 80) includes an IP address of the respective nodes that receive the packet. A third column (bracket 82) includes a round trip time (RTT) that indicates how long it took the packet to travel from the originating device to the respective node, and back to the originating device. A fourth column (bracket 84) includes the associated marking (i.e., DSCP marking) for the packet.

In this example, the packet had a marking of 34 when transmitted by the source device. The marking of 34 remained unchanged from the first to the fifth node. However, at the sixth node the marking changed to a value of eight. Accordingly, at the fifth hop (i.e., device or node) in this route the marking changed from a value of 34 to eight. As such, the operator can quickly identify the specific node in which a marking change occurred. The operator may then telnet into the fifth node (68.86.208.33 in this example) to examine that node's (e.g., router/switch) configuration to determine whether the change was intended. It is also recognized that the change in the DSCP value illustrated in the fourth column (bracket 84) could have resulted from a device (e.g., deep packet inspection device) that was inserted between nodes 5 and 6.

Now referring to FIG. 5, an alternative embodiment is provided. In this embodiment, a first column (bracket 88) indicates the hops within a packet route. A second column (bracket 90) indicates an IP address of the devices at the respective nodes. A third column (bracket 92) indicates the round trip time (RTT). A fourth column (bracket 94) indicates a DSCP marking. Finally, a fifth column (bracket 96) indicates a mapped MPLS marking that corresponds with the DSCP marking. In this example, the DSCP marking remains unchanged throughout the packet route. However, the operator is also able to determine the EXP bits marking of the MPLS header that are mapped to the DSCP marking. As shown in this example, the experimental bits having a value of 8 are mapped to the DSCP bit 34. Conventionally, the customer/operator is required to contact the operator of the MPLS enabled network to learn the mapping rule between MPLS EXP bits and DSCP bits at the network boundary. The teachings of the present invention improve the process for determining the mapping between the EXP bits in MPLS header and the DSCP bits in IP header.

Now, referring to FIG. 6, yet another embodiment of a display is provided. In this embodiment, the operator has executed a trackDSCP tool that causes each possible DSCP value to be inspected. Conventionally, DSCP values have a range of 0 to 63. Thus, a different packet may be transmitted for each DSCP marking (i.e., 0-63). In this embodiment, upon running the trackDSCP tool, 64 packets will be generated for each TTL value, wherein the first packet may have a value of 0, the second packet a value of 1, the third packet a value of 2, until the $64^{th}$ packet is transmitted with the value of 63. This embodiment may be advantageous because, it is recognized that, in some cases, a DSCP value having one value (e.g., DSCP=34) may experience a marking change while packets having a different DSCP value (e.g., DSCP=42) do not experience a change. Accordingly, generating a packet for every possible DSCP value enables the operator to determine which packets having certain DSCP values experience undesired marking changes by network devices.

In FIG. 6, each node is indicated in a first column (bracket 100), while the particular IP address of the node (e.g., router, server, device and the like) at a respective node is shown at 110. Accordingly, field 120 provides the DSCP values for the 64 packets. As shown for nodes 1-6, the DSCP values for the packets are in sequence (i.e., 0, 1, 2, 3 . . . 63). However, as shown at nodes 6-10, the 35$^{th}$ packet marking (labeled 140) is out of sequence. Preferably, as shown at nodes 1-5, the DSCP markings for nodes 6-10 should be displayed in numerical sequence (e.g., DSCP: 0, 1, 2, 3 . . . 31, 32, 33, 34, 35 . . . 63). Nevertheless, beginning at the sixth node, the 35$^{th}$ packet 140 is marked with the DSCP marking of 8, as opposed to 34. This change in the DSCP marking for the 35$^{th}$ packet 140 indicates that a device prior to node 6 causes packet marking changes for packets having a DSCP marking of 34. As such, the operator is able to efficiently identify the specific node(s) (in this case node 5) that cause a marking change to certain DSCP marked packets (e.g., packets having a DSCP marking of 34).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method, comprising:
   sending, by a computer, a first plurality of data packets into a network, each of the first plurality of sent data packets having a same indicated destination, a same first time-to-live (TTL) indication, and a different differentiated services code point (DSCP) marking;
   sending, by the computer, a second plurality of data packets into the network, each of the second plurality of sent data packets having the same indicated destination, a same second TTL indication different from the first TTL indication, and a different DSCP marking;
   for each of the first and second pluralities of sent data packets, the computer receiving a reply data packet that identifies the sent data packet, that identifies the computer as a destination of the reply data packet, and that further identifies a DSCP marking;
   for each of the reply data packets, the computer determining the DSCP marking identified by the reply data packet; and
   causing a display device to display, for each of the first and second TTL indications, an indication of the determined DSCP markings of the reply data packets that correspond to the sent data packets having that TTL indication.

2. The method of claim 1, wherein each of the reply data packets comprises an Internet Control Message Protocol (ICMP) message.

3. The method of claim 1, wherein causing the display device to display comprises displaying on the display device, for each of the first and second TTL indications, the indication of the determined DSCP markings of the reply data packets that correspond to the sent data packets having that TTL indication.

4. An apparatus, comprising:
   a computer configured to:
   send a first plurality of data packets into a network, each of the first plurality of sent data packets having a same indicated destination, a same first time-to-live (TTL) indication, and a different differentiated services code point (DSCP) marking;
   send a second plurality of data packets into the network, each of the second plurality of sent data packets having the same indicated destination, a same second TTL indication different from the first TTL indication, and a different DSCP marking;
   for each of a plurality of received reply data packets that each identifies one of the first or second pluralities of sent data packets, that each identifies the computer as a destination of the reply data packet, and that each identifies a DSCP marking, determine the DSCP marking identified by the reply data packet; and
   cause a display device to display, for each of the first and second TTL indications, an indication of the determined DSCP markings of the reply data packets that correspond to the sent data packets having that TTL indication.

5. The apparatus of claim 4, wherein each of the reply data packets comprises an Internet Control Message Protocol (ICMP) message.

6. The apparatus of claim 4, further comprising the display device.

7. A method, comprising:
   sending, by a computer, a first plurality of data packets into a network, each of the first plurality of sent data packets having a same indicated destination, a same first time-to-live (TTL) indication, and a different differentiated services code point (DSCP) marking;
   sending, by the computer, a second plurality of data packets into the network, each of the second plurality of sent data packets having a same second TTL indication different from the first TTL indication, and a different differentiated services code point (DSCP) marking;
   for each of the first and second pluralities of sent data packets, the computer receiving a reply message that identifies the sent data packet, that identifies the computer as a destination of the reply message, and that further identifies a differentiated services code point (DSCP) marking;
   for each of the reply messages, the computer determining the differentiated services code point (DSCP) marking identified by the reply message; and
   causing a display device to display, for each of the first and second TTL indications, an indication of the determined differentiated services code point (DSCP) markings of the reply messages that correspond to the sent data packets having that TTL indication.

8. The method of claim 7, wherein each of the reply messages comprises an Internet Control Message Protocol (ICMP) message.

9. The method of claim 8, wherein at least some of the reply messages comprises an ICMP time-exceeded message.

10. The method of claim 9, wherein one of the reply messages corresponding to one of the data packets of the first plurality of data packets is an ICMP port unreachable message, and one of the reply messages corresponding to one of the data packets of the second plurality of data packets is also an ICMP port unreachable message.

* * * * *